United States Patent

Finkhäuser et al.

[15] 3,673,341

[45] June 27, 1972

[54] CALL RE-ROUTING SYSTEM FOR TELEPHONE INSTALLATIONS

[72] Inventors: Dieter Finkhäuser, Wolfratshausen; André Friese, Gauting, both of Germany

[73] Assignee: Siemens Aktiengesellschaft, Berlin and Munich, Germany

[22] Filed: May 6, 1968

[21] Appl. No.: 726,918

[30] Foreign Application Priority Data

May 12, 1967 Germany ............................S 109850

[52] U.S. Cl. ........................................................179/18 BE

[51] Int. Cl. ........................................................H04m 3/54

[58] Field of Search ............179/18.03, 18.02, 18.21, 18 EA, 179/18 BD, 18 BE

[56] References Cited

UNITED STATES PATENTS

| | | | |
|---|---|---|---|
| 2,957,047 | 10/1960 | Wennemer | 179/18.03 |
| 2,951,908 | 9/1960 | Malthaner et al. | 179/18.03 |
| 3,178,516 | 4/1965 | Bonanno | 179/18.03 |
| 3,197,566 | 7/1965 | Sanders et al. | 179/18.03 |
| 3,502,818 | 3/1970 | Oden et al. | 179/18.03 |

FOREIGN PATENTS OR APPLICATIONS

| | | | |
|---|---|---|---|
| 971,602 | 9/1964 | Great Britain | 179/18 BE |

*Primary Examiner*—Kathleen H. Claffy
*Assistant Examiner*—Randall P. Myers
*Attorney*—Birch, Swindler, McKie & Beckett

[57] ABSTRACT

A call re-routing system for communication installations having central storage means with storage locations permanently assigned to subscriber stations. Information stored in these locations determines re-routing of calls to the corresponding stations from the latter station to the station location identified in said storage means, and may be changed at will for cancellation or further re-routing of calls from any subscriber station.

4 Claims, 3 Drawing Figures

Patented June 27, 1972 3,673,341

3 Sheets-Sheet 1

Patented June 27, 1972 3,673,341

3 Sheets-Sheet 3

CALL RE-ROUTING SYSTEM FOR TELEPHONE INSTALLATIONS

CROSS REFERENCE TO RELATED APPLICATION:

Applicants claim priority from corresponding German Pat. application, Ser. No. S109,850, filed May 12, 1967.

BACKGROUND OF THE INVENTION

1. Field of the Invention

This invention relates to a call re-routing system for centrally controlled telecommunication installations, and more particularly, to PBX exchanges.

2. Description of the Prior Art

In the prior art there are provided switching arrangements for telephone installations for enabling re-routing of calls. In one such prior art arrangement, a plurality of special relay sets are provided for processing re-routing call connection demands. Upon receipt of an identification digit for demanding the call re-routing function, a free relay set is selected. In this relay set there is first stored information identifying the subscriber station assigned to the subscriber desiring the re-routing and, in response to subsequent dialing, information identifying the new subscriber station to which the calls for the first subscriber station are to be re-routed. This information also must identify the demand for the call re-routing operation.

Such installations may also include a plurality of dial storage means and evaluation switching devices. When a subscriber station of the installation is called, a dial storage means is seized for storage of the dial code of the called station. The evaluation switching devices compare the information thus stored in the dial storage means with information in the relay sets to determine whether a call re-routing order exists for the called subscriber station. Upon completion of this comparison and evaluation, the connection is completed by connecting the relay set assigned to the called speaking station for the call re-routing operation, as determined by the comparison, to the re-routed, called speaking station.

Such prior art systems are undesirably expensive since several dial storage means and relay sets and associated switching systems are required for the evaluation and transmission of the information. Further, the number of simultaneously existing, re-routed call connections is limited by the number of available storage means.

SUMMARY OF THE INVENTION

The call re-routing system of the invention overcomes these and other limitations and defects of prior art systems, including the limitation on the number of simultaneously re-routed call connections, is low in cost, and provides efficient and rapid operation.

In accordance with the invention, the call re-routing system is centrally controlled, and includes centrally located storage means. For each subscriber station of the installation there is permanently assigned a storage location within the storage means. Upon receipt of appropriate dial information, such as a dial code representing a demand for a call connection to a subscriber station of the installation, the storage location assigned to that called subscriber station is marked, or addressed. Depending on the information stored in this storage location, which information can be changed at will in accordance with the desire of that subscriber for re-routing of calls, the subscriber station corresponding to and identified by the thus stored information is marked and the connection is completed to that speaking station.

The switching arrangement of the invention eliminates the need of additional comparison switching devices, as required by prior art systems, while permitting each subscriber of the telephone installation, in an extreme case, to store a demand for call re-routing and to engage in completed, re-routed call connections. A further advantage of the invention over prior art systems is that no connection means is required for separate storage means for the processing of call re-routing demands. In addition, evaluation switching means which are required in prior art systems for controlling the establishment of call connections whether call re-routing is desired or not, are not necessary in the system of the invention and can be omitted.

The apparatus for call re-routing in the system of the invention is required only in a central location of the installation, and, particularly, in the processing circuits between the dial signal evaluator and subscriber station connecting means. Any existing installation may be modified to include the call re-routing storage means of the invention by connecting this storage means in circuit between the output of the evaluation means and the input of the subscriber station connecting means.

The call re-routing storage means of the invention advantageously may employ magnetic core storage means rather than relay storage means as typically employed in prior art systems. Core storage has the advantage that it consumes energy only for a short period of time in which the cores are set, since no holding currents are necessary.

The system of the invention presents further operating capabilities. For example, in installations wherein all subscriber stations have access to, or are adapted for demanding the function of, the call re-routing system and wherein circuitry is provided which includes an identification indicator to indicate the destination of a demanded call connection, the operator of said circuitry may, simply by placing a call, determine the current location of a subscriber who has re-routed his call.

The re-routing system of the invention is flexible and adaptable to the needs of a given installation and, for example, does not require that all subscriber stations of the installation have access to the call re-routing system. In such an embodiment, only the subscriber stations having the re-routing capability are connected at their output connection leads to the dial evaluation means for further connection to the call re-routing storage means. The remaining outputs of the dial evaluation means, corresponding to subscriber stations which do not have access to the call re-routing system, are connected directly to the subscriber station connecting means. In such a combined system, all of the features of the invention are advantageously employed, with the obvious exception that since all subscribers of the installation do not have the re-routing capability, they may not all simultaneously store a call re-routing demand and will not all have access to the call re-routing storage means.

These and other features and advantages of the system of the invention are disclosed in detail in the following drawings, and will be appreciated more fully from the following detailed description.

DETAILED DESCRIPTION OF THE INVENTION

Figure 1:
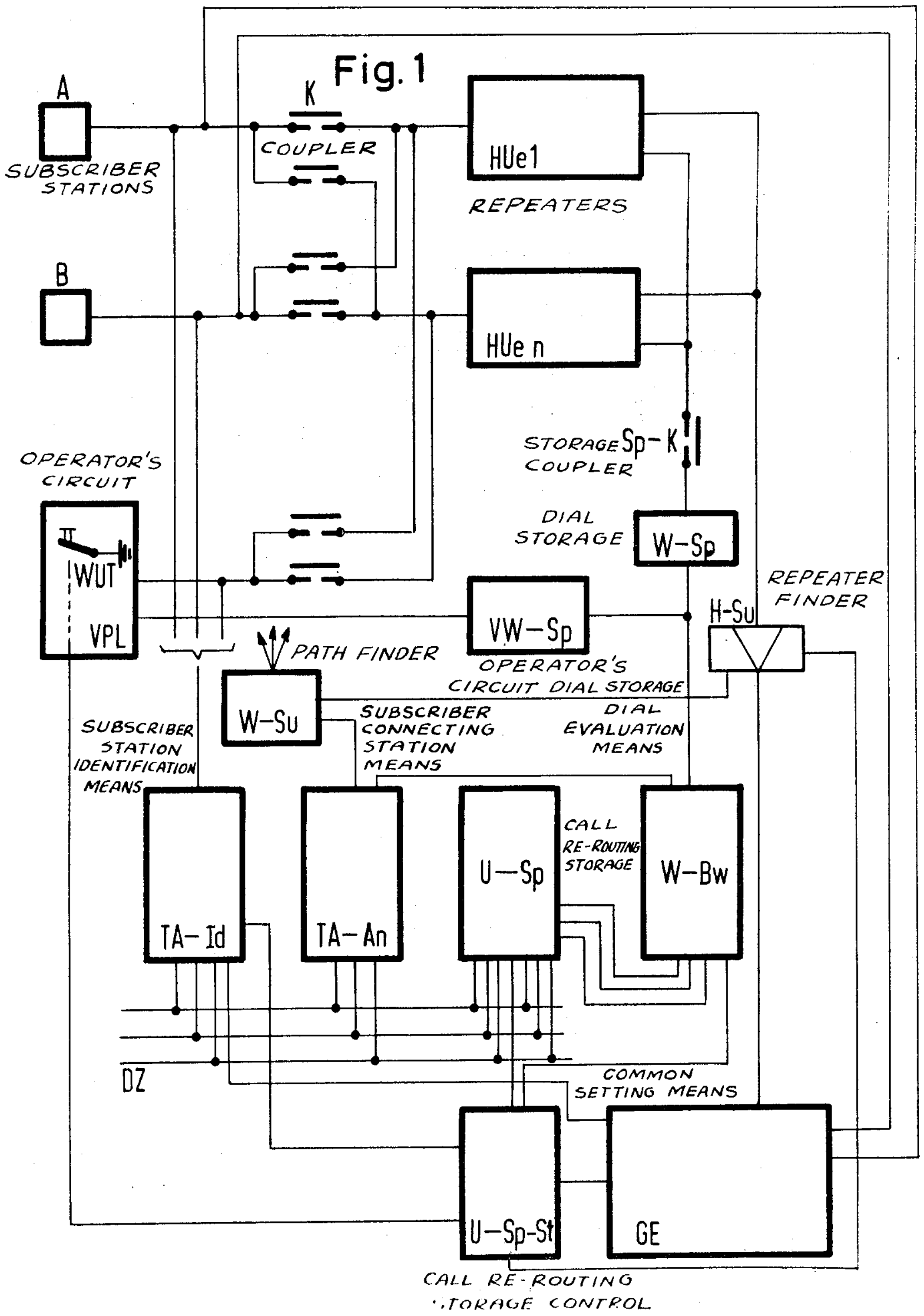
FIG. 1 shows, in block diagram form, the system of the invention incorporated into a subscriber installation having extension stations.

In FIG. 1, there is shown in block diagram a subscriber installation including two subscriber extension stations A and B, illustrative of a plurality thereof, and an operator's circuit or system VPL. Coupler K, which may comprise a switching matrix, provides for selective communication, or connections, of the subscriber stations A and B and the operator's circuit VPL with a plurality of internal, house repeaters HUe1,— and HUen. Dial storage means W-Sp assigned to house repeaters HUe provides for storage of dial signal information received from a calling subscriber station, such as A or B, when the latter is connected over coupler K to one of the repeaters HUe1—HUen and through storage coupler Sp-K to the dial storage means W-Sp. An operator's circuit dial storage means VW-Sp is permanently assigned, or connected, to the operator's circuit VPL.

In the following brief description of the development of an internal connection in the installation of FIG. 1, it is assumed that the subscriber at subscriber station A desires to call the subscriber at subscriber station B. The subscriber lifts the receiver at station A, resulting in transmittal of a call impulse to the common setting means GE of the installation in a conventional manner. The common setting means GE controls house repeater finder H-Su to effect the selection of a free house repeater, for example house repeater HUe1, for employment in the processing of the anticipated call connection. The common setting means GE requests, through the operation of subscriber station identification means TA–Id, the identification of the calling subscriber station. This identification is produced at the output of the identification means TA–Id and is transmitted over the decoded digit multiple DZ to the input of the subscriber station connecting means TA–An. The output of the subscriber station connecting means TA–An is connected to path finder W–Su which, in turn, sets the switching matrix, or coupler, K.

Path finder W–Su can effect the setting of the switching matrix K to provide coupling paths only if both the starting, or initiating, point and the stopping, or terminal point, of the connection are established or fixed. In the present example, the starting point of the connection is determined by the identification of the calling subscriber station A and the terminal point of the connection is determined by the identification of the previously assigned, free house repeater HUe1, the selection and identification of which were effected previously by the house repeater finder H–Su. The information identifying the free, selected house repeater is conveyed to path finder W–Su from house repeater finder H–Su, as shown in the drawing. Path finder W–Su responds to this input information to effect setting of the switching matrix K to complete the connection path between subscriber station A and the selected, free house repeater HUe1.

The dial storage means W–Sp is thereupon connected through storage coupler Sp–K, house repeater HUe1, and switching matrix K to the calling subscriber station A. In a conventional manner, the subscriber is signalled to initiate transmission of the dial or digit signals identifying the demanded call connection. In the present example, the subscriber at subscriber station A dials the subscriber number of subscriber station B. The dial information is received and stored in the dial storage means W–Sp assigned to the seized house repeater HUe1 over the storage coupler Sp–K. This subscriber number information then is transmitted from dial storage means W–Sp to the dial evaluation means W–Bw.

Dial evaluation means W–Bw in the known manner evaluates the dial information thus received and conveys the results of this evaluation to a decoded digit multiple connected at its output. In this example, the evaluation comprises the information that the desired, called subscriber station is subscriber station B.

In accordance with known techniques of the prior art systems, the decoded digit multiple to which the output of the dial evaluation means is applied has direct access to, or is connected directly to, the subscriber station connection means TA–An. As described above, the subscriber station connection means TA–An sets path finder W–Su. The path finder W–Su then responds to the information output of house repeater finder H–Su, establishes a connection between the seized house repeater HUe1 and the desired subscriber station B, thereby connecting stations A and B over the selected house repeater HUe1.

In contrast to the prior art systems, the system of the invention includes a call re-routing storage means U–Sp connected between the decoded digit multiple at the output of the dial evaluation means W–Bw and the subscriber station connection means TA–An. The information thus supplied to the decoded digit multiple from dial evaluator W–Bw identifying the desired, called subscriber station, is employed in accordance with the invention to address the storage location of the call re-routing storage means U–Sp which is permanently assigned to the called subscriber station. In response to the addressing, the storage location assigned to the desired subscriber station is read out and the information stored therein is applied to the decoded digit multiple DZ for application, in turn, to the subscriber station connection means TA–An.

If desired, the system of the invention may provide for connection of only selected outputs of the dial evaluation means W–Bw to the subscriber station connection means TA–An over the call re-routing means U–Sp, and connection of all the remaining outputs directly to the subscriber connection means TA–An.

In the processing of a conventional connection demand, and thus in the absence of a demand for the re-routing function, the information stored in the storage location of the call re-routing storage means U–Sp assigned to a given subscriber station merely identifies that subscriber station. Thus, upon interrogation of the storage means for reading out of the information stored in the storage location assigned to a called subscriber station, the same information is produced at the output of the call re-routing storage means U–Sp as was initially applied to the input of the dial evaluation means W–Bw for determining the address of that assigned storage location. The information thus read out from storage is utilized, as described previously, for setting the subscriber station connection means TA–An and completing the connection to the desired, called subscriber station B.

The re-routing function becomes useful when, for example, a subscriber leaves his normal subscriber station and will be absent therefrom for an extended period of time, but wishes to have calls to his original subscriber station automatically re-routed to a different subscriber station at which he will be present. For example, subscriber A may be absent from his subscriber station A but will be in the vicinity of subscriber station B, and wishes to have calls automatically re-routed to the station B.

To accomplish the re-routing, the subscriber of subscriber station A lifts the receiver at subscriber station B. As described previously, subscriber station B is thereby connected through coupler K to a free house repeater HUe such as house repeater HUe1. The calling subscriber thereupon dials an identification digit preselected to initiate the call re-routing. The identification digit may be a single digit such as 8, or a digit with more than one number. Preferably, a secret identification digit is assigned to avoid improper use of the call re-routing capability. The subscriber thereafter dials his own assigned subscriber station number, namely that of the station A.

The identification digit demanding the call re-routing function and the subsequently dialed subscriber identification number of the station A are thereby transmitted to and stored in dial storage means W-Sp. This information, in a conventional manner, is transmitted to the dial evaluation means W–Bw. The dial evaluation means W-Bw responds to the call re-routing identification digit 8 to recognize the demand for the call re-routing function and to initiate the implementation of that function. The means W–Bw evaluates the identification number of subscriber station A, dialed following the digit 8, for addressing, in a known manner, the storage location assigned to the subscriber station A in the re-routing storage means U–Sp. Upon receipt of the identification digit 8, the calling subscriber station B is identified in any suitable manner. Any information previously stored at the assigned storage location of the storage means U-Sp, thus addressed, is cancelled and the identification of the calling subscriber station, in this case the subscriber station B, is recorded in its place. The cancellation of previously stored information and the storing of the new information in the storage means U–Sp, in response to the dial identification digit and the evaluation thereof by the means W–Bw, is effected with the aid of the call re-routing storage control system U-Sp–ST.

When the re-routing capability has thus been established, a call connection demand for subscriber station A will be processed by the installation to complete that connection to the station B. In this operation, the storage location assigned to subscriber station A in the call re-routing storage means U–Sp is addressed in response to evaluation of the dial information of that demand by the evaluation means W-Bw. The information stored in this location is read out from the storage means U–Sp and applied to the subscriber station connection means TA–An. The connection means TA–An processes the information thus presented to it to complete the call connection to the station B.

The call re-routing function may be cancelled when desired, for example, when the subscriber returns to his own station A, or may be cancelled and re-routed to a further subscriber station by repeating the above-described operation. In the cancellation operation, the subscriber station from which the call is placed to effect the cancellation is recorded as new information in the storage location assigned to the subscriber station of the calling subscriber.

The initiation of call re-routing, however, may be effected through an alternative operation in which the subscriber merely indicates the desire for the re-routing function to an operator at the operator's circuit of the installation, and the operator then performs the steps necessary to accomplish the re-routing. In this mode of operation, the subscriber of speaking station A, currently at speaking station B for example, dials the notification or identification digit 8 as before, and is connected over an appropriately selected house repeater to the operator's circuit VPL. In response to the inquiry of the operator at the operator's circuit VPL, the subscriber indicates the subscriber number of his speaking station A and the desire to re-route calls from the station A to the subscriber station B. Since the identification of the subscriber station B is effected automatically, as above described, it is not necessary for the subscriber to identify the speaking station B. Eliminating this phase of identification is desirable since it is not the subscriber's normal station and errors may well result in its identification if oral communication were required.

The operator at exchange place VPL completes the re-routing in a manner similar to that previously described. The operator dials the identification digit for demanding the re-routing and the calling number of the station A from which calls are to be re-routed. Through the operation of dial evaluation means W–Bw, the storage location assigned to the station A in the storage means U–Sp is addressed, the information at that location is cancelled, and new information identifying the calling number of station B is recorded in its place. When this process is completed, the subscriber at station B receives a busy signal and replaces the receiver. The busy signal is generated in a conventional manner and, of course, results from the fact that the operator has effectively placed a call to station A which has been now successfully re-routed to station B which is in use.

The speed with which the re-routing operation in which the operator at the operator's circuit VPL participates may be increased in the following manner. The exchange place VPL may be equipped with a dial conversion push button WUT which the operator actuates for directly seizing the call conversion, or re-routing, storage control system U–Sp–St. The rapid seizure through actuation of the push button WUT thus eliminates the more time-consuming operation, as earlier described, in which the operator dials the identification digit, such as the digit 8, to demand the re-routing function and which thereupon requires use of the dial evaluation means W–Bw to complete the re-routing. Thus, after actuating the dial conversion push button WUT, the operator dials the subscriber number mentioned to her by the calling subscriber. The number dialed is stored in the operator's circuit dial storage means VW–Sp assigned to the exchange place VPL and thereafter is conveyed to the dial evaluation means W–Bw. In the manner previously described, the dial evaluation means W–Bw evaluates the dialed number to address the storage location permanently assigned to the corresponding speaking station, and the new information identifying the speaking station to which calls are to be re-routed is thereupon stored at that addressed location.

Figure 2:
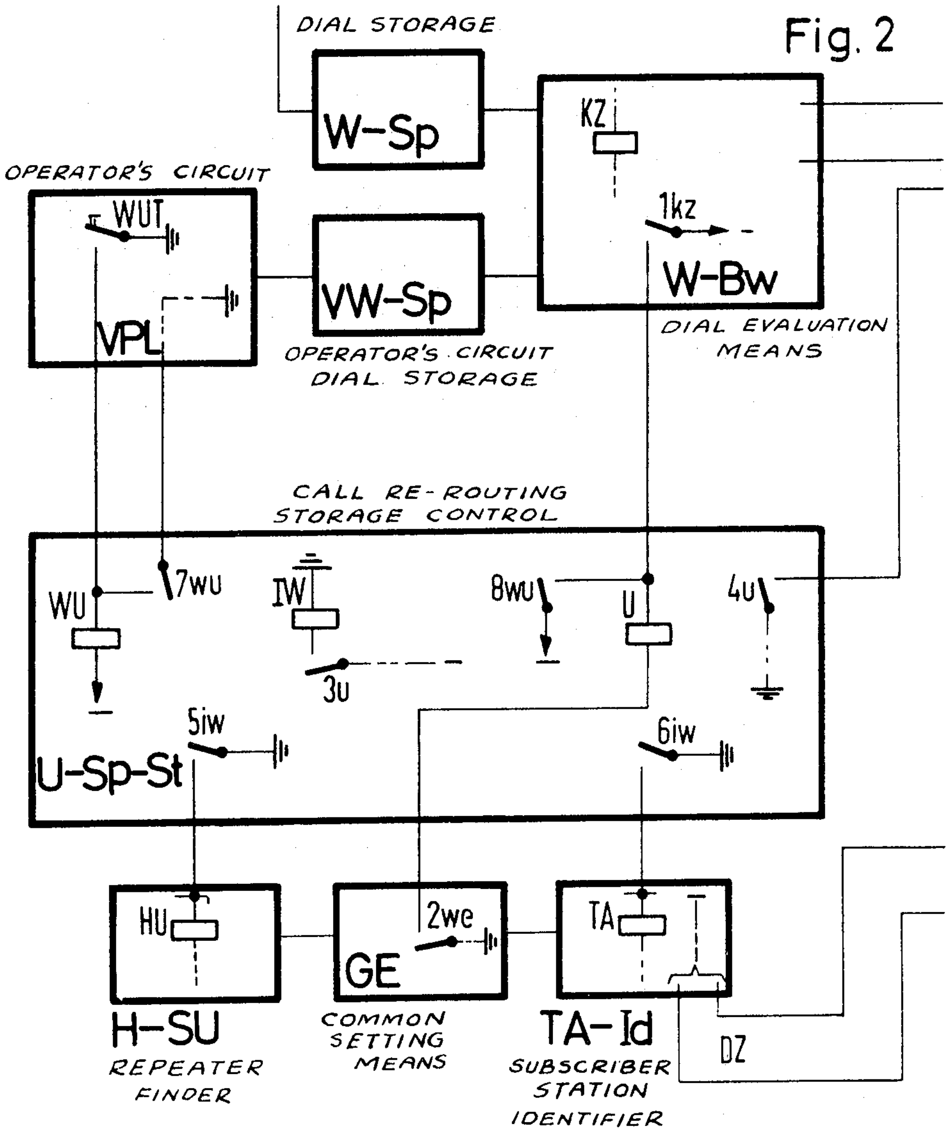
FIG. 2 shows, in block diagram form, details of various of the systems employed in the installation of FIG. 1, including a magnetic core storage and associated control system for call re-routing and connections thereof to dial evaluation means and subscriber identification means in accordance with the practice of the invention.
Figure 3:
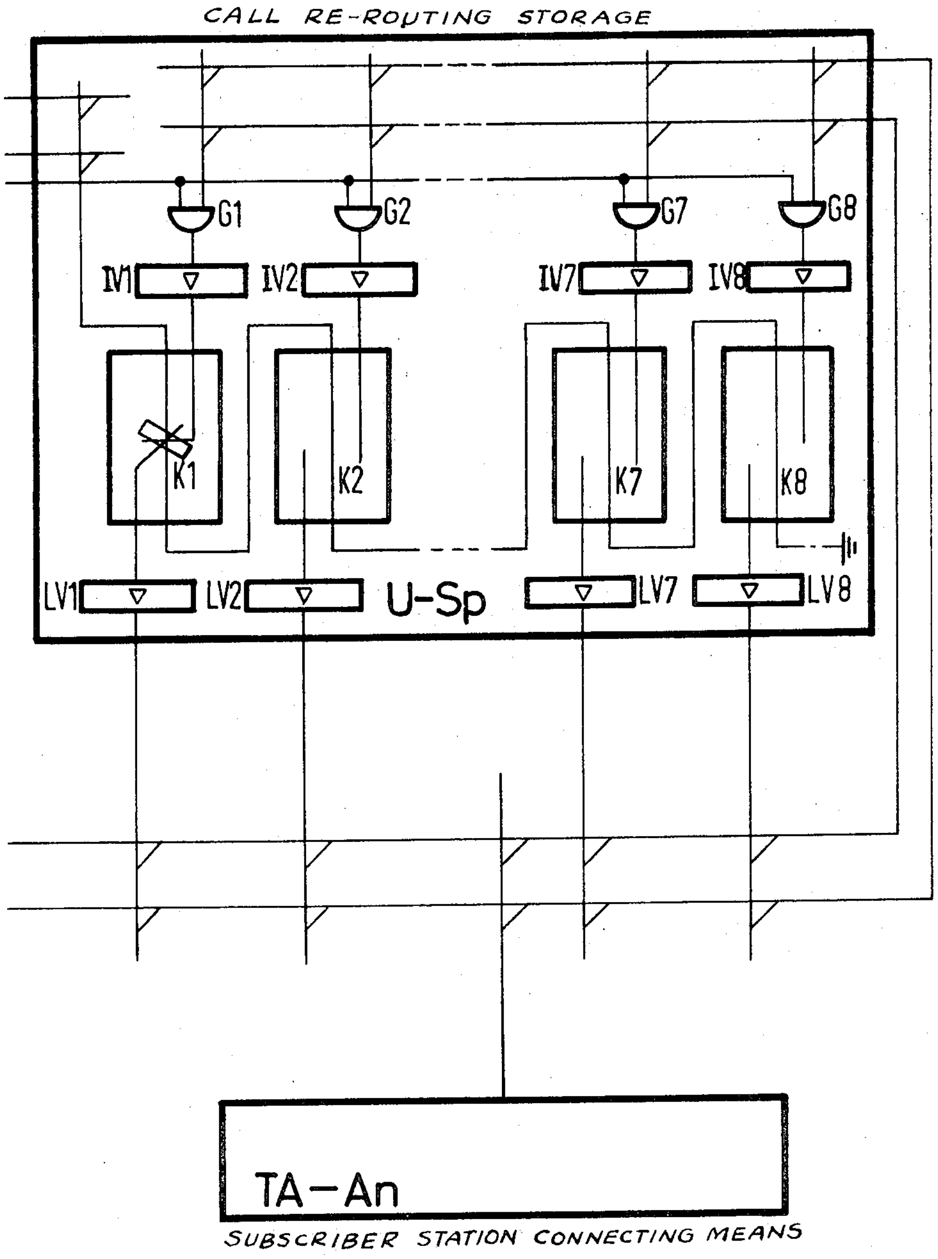
FIG. 3 is a continuation of FIG. 2, the latter two figures are to be placed side by side with FIG. 2 on the viewer's left.

FIGS. 2 and 3 disclose in greater detail the systems of the invention necessary for effecting the call re-routing operation, and particularly those related to control and operation of the call re-routing storage means U–Sp. The systems of FIG. 1, disclosed in FIGS. 2 and 3, are identified by identical labels. The system of FIGS. 2 and 3 includes the operator's circuit VPL with the dial conversion push button WUT and dial storage means W-Sp which, as noted in relation to FIG. 1, is assigned to a seized house repeater. An operator's circuit dial storage means VW–Sp is permanently assigned to the operator's circuit VPL. Dial information stored in both of the storage means W–Sp and VW–Sp is transmitted to the dial evaluation means W–Bw.

The identification relay KZ in the dial evaluation means W–Bw is energized in response to the dialing of the identification digit 8 from any location of the installation, and initiates operation of the call re-routing storage control means U–Sp–St. Alternatively, the control means U–Sp–St may be controlled in direct response to actuation of the dial conversion push button WUT at the operator's circuit VPL, in accordance with the above-described initiation of re-routing by an operator.

The call re-routing storage control means U–Sp–St, as shown in FIG. 2, has direct access to the house repeater finder H–Su and to the subscriber station identification system TA–Id which are used for the identification of the calling subscriber station. The common setting means GE controls the course or progress of the program of operation.

The call re-routing storage means U–Sp is connected at its inputs both to the decoded digit multiple DZ, which, in turn, is connected to subscriber station identification means TA–Id, and to the decoded digit multiple which, in turn, is connected to the dial evaluation means W–Bw. The outputs of the call re-routing storage means U–Sp are connected to the subscriber station connection means TA–An.

The decoded digit multiples, as shown, characterize a two digit number. Each line in the drawings therefore symbolizes the ten possible digits of a single digit place of this number.

Preferably, the call re-routing storage means U–Sp comprises a core storage system. Core storage systems are advantageous in that they require no expenditure of energy to remain in a set state or position. As disclosed above, each subscriber connection or station is assigned a permanent storage place or location within the storage means U–Sp. To simplify the drawings, only one such storage location is shown.

It may be assumed that each digit is stored in a four core code. Thus, for a two digit number corresponding to the present example, eight cores comprising two sets of four cores are provided. Only cores K1, K2, and K7, K8 are shown in FIG. 2. The storage means, of course, is not limited to this specific number or arrangement of cores.

The dial evaluation means W–Bw responds to the subscriber identification code applied as an input thereto to effect the addressing of the cores of each storage location over the associated decoded digit multiple. New information to be stored in the cores of an identified storage location is transmitted to the cores from the subscriber station identification means TA–Id over the decoded digit multiple and associated switches G1 to G8 and inhibition amplifiers IV1 to IV8. The recording of new information cancels the previously stored information. In the interrogate operation, information read out from the cores K1 to K8 of the storage means U–Sp is amplified by corresponding read amplifiers LV1 to LV8 and applied over decoded digit multiple DZ to the subscriber connection means TA–An. The connection means TA–An thereupon effects the necessary connection corresponding to this information.

In the following detailed description of operation, it is assumed that the subscriber of subscriber station A is at subscriber station B and desires to re-route calls from station A to station B. The subscriber therefore lifts the receiver at subscriber station B, as previously described, and is connected with a free dial storage means W–Sp over a selected, free house repeater such as HUe1. The subscriber then dials the identification digit 8, preselected to demand the call re-routing function and thereafter the subscriber number of his own subscriber station A. This information is transmitted from dial storage means W–Sp to the dial evaluation means W–Bw.

The identification relay KZ is actuated in the dial evaluation means in response to receipt of the identification digit 8. The energized relay KZ actuates its contact 1kz to prepare an energization circuit for the conversion, or re-routing, relay U in the call re-routing storage control system U–Sp–St. The further dial information, which in this example comprises the subscriber number of subscriber station A, is evaluated by dial evaluation means W–Bw. The output of means W–Bw is applied over the associated digit multiple to address the storage location of the storage means U–Sp which is permanently assigned to the subscriber station A, and to thereby control the cores K1 to K8 over their associated address windings.

Upon completion of dialing, a dial end relay WE, of which only contact 2we is shown, is energized in the common setting means GE to actuate contact 2we to a closed position. This completes the energizing circuit for conversion, or re-routing relay U of the storage control means U–Sp–St, previously prepared by closure of contact 1kz. The energized relay U actuates its contacts 3*u* and 4*u* to a closed position. The closed contact 3u completes an energizing circuit for relay IW for effecting an identification operation. The closed contact 4*u* completes an energizing circuit for providing a first enabling input to each of the switches or gates G1 to G8. The second enabling input to gates G1 to G8 comprises the dial identification information applied to the decoded digit multiple DZ by the subscriber station identification system TA–Id. The enabled gates G1 to G8 effect energization of the corresponding inhibit amplifiers IV1 to IV8 to energize the write windings of cores K1 to K8, respectively.

The identification of the calling subscriber station is effected through actuation of the contacts of relay IW of the call re-routing storage control means U–Sp–St. As noted, closure of contact 3*u* energizes relay IW which thereupon closes its corresponding contact 5*iw* to energize relay HU of the house repeater finder H–Su. Through this operation, a free house repeater is seized by the calling subscriber station and the identity of the seized repeater is determined. After seizure of the house repeater, and in a conventional manner, through closure of contact 6*iw* responsive to energization of relay IW, relay TA is energized in the subscriber station identification system TA–Id. The subscriber station identification means TA–Id thereby identifies the subscriber station which seized the house repeater. The information identifying this subscriber station, namely, the subscriber station B of the present example, is applied to the decoded digit multiple DZ, through the correspondingly enabled gates G1 to G8 to the associated write windings of cores K1 to K8, respectively.

Once the identification of station B is stored in the storage location of station A, the call re-routing operation is completed and the calling subscriber at subscriber station B receives a busy signal and replaces the receiver. When the installation receives a call connection demand for the subscriber station A, the processing of this demand results in addressing of the storage location assigned to the subscriber station A in the call re-routing storage means U–Sp as the result of the information presented on the decoded digit multiple output connection of the dial evaluation means W–Bw. The information stored in the cores K1 to K8 is read out over the read windings associated with these cores by the read amplifiers LV1 to LV8 and forwarded to the subscriber station connecting means TA–An. The call connection demand is thereby processed to complete the call connection to the subscriber station identified by this read-out information which, in this example, is the subscriber station B. As also noted previously, the subscriber may cancel the call re-routing upon return to his own subscriber station by performing a similar re-routing operation at his own subscriber station A in which station A is identified as the intended destination of calls for station A. Alternatively, the call re-routing may be effected for any other speaking station within the installation.

In accordance with the earlier described operation, the initiation of the call re-routing may be carried out by an operator at the operator's circuit VPL. The subscriber desiring the call re-routing does not dial the identification digit, but rather a suitable code to request the operator's circuit VPL. The subscriber merely informs the operator of his desire for re-routing calls from an identified subscriber station to the subscriber station at which he is presently located. The operator at operator's circuit VPL dials the identification digit 8 to demand the re-routing operation, and then dials the subscriber station number mentioned to her by the calling subscriber. The number thus dialed by the operator is applied through the operator's circuit dial storage means VW–Sp to the dial evaluation means W–Bw, whereupon the call re-routing operation is performed.

Alternatively, the operator may actuate a dial conversion push button WUT to directly request the call re-routing storage control means U–Sp–St for performing the call re-routing operation. Upon actuation of the dial conversion push button WUT, relay WU is energized in the storage control means U–Sp–St. A holding circuit for relay WU is provided through its contact 7wu which is actuated to a closed position when relay WU is energized, and through suitable circuits provided in the exchange place VPL. Contact 8wu is also actuated to a closed position when relay WU is energized, and prepares an energization circuit for the relay U similar to that provided by the contact 1*kz* in the dial evaluation means W–Bw. The subsequent closure of contact 2*we*, responsive to energization of the dial end relay WE of the common selecting means GE, completes the energizing circuit for the relay U. The call re-routing operation thereupon takes place in the manner previously described.

In summary, the system of the invention provides a highly flexible and versatile call re-routing function for telecommunication installations, and particularly for telephone subscriber installations having extension stations. The system employs central control of information storage, and of switching and re-routing operations in providing increased re-routing capacity while minimizing the complexity and expense of the installation.

It will be evident that many minor changes may be made in the apparatus described herein, without departure from the scope of the invention. Accordingly, the invention is not to be considered limited by such description, but only by the scope of the appended claims.

What is claimed is:

1. A call re-routing system for telecommunication installations, comprising:

storage means (U–sp) having a plurality of storage locations each of which is permanently assigned to a corresponding subscriber station of the installation which subscriber station is authorized to have calls re-routed therefrom, for recording in each said storage location information identifying a subscriber station to which a call to said corresponding station is to be routed, dial information evaluation means (W–Bw) for evaluating dial information received from a calling subscriber station and for identifying a desired, called subscriber station which is authorized to have calls re-routed therefrom, to address the storage location of the called subscriber station in said storage means, said storage means being connected to said dial evaluation means to receive decoded dial information therefrom such that the storage location therein for each said corresponding subscriber station is addressed whether or not re-routing is to take place, said dial evaluation means including means for receiving and operating responsive to information transmitted by the called subscriber from a subscriber station other than the called subscriber station for demanding call re-routing to said other subscriber station, identification means (TA–Id) responsive to receipt of the information from the called subscriber for automatically identifying said other subscriber station, control means (U–Sp–St) responsive to recognition by said dial evaluation means (W–Bw) of a call re-routing demand and to receipt of complete dial information for identifying the subscriber station normally assigned to said called subscriber to enable said storage means for recording information identifying said other subscriber station, as identified by said identification means, and the storage location corresponding to the said normally assigned station of the called subscriber, and subscriber station connection means (TA–An) responsive to said storage means for completing a call connection between said calling subscriber station and said other subscriber station identified by the information stored in the storage location of the called subscriber station.

2. A call re-routing system as recited in claim 1 wherein said storage means comprises a magnetic core storage means in each said storage location.

3. A call re-routing system as recited in claim 1 wherein the installation includes an operator's circuit, and there is further provided:

switch means (WUT) at said operator's circuit (VPL) for direct control of the storage control means (U–Sp–St).

4. A call re-routing system as recited in claim 1 wherein said storage means (U–Sp) includes means for recording information identifying said other subscriber station in response to said identification means (TA–Id) and to said dial evaluation means (W–Bw) and for cancelling information previously recorded at each storage location.

* * * * *